United States Patent [19]

Rapp et al.

[11] Patent Number: 5,523,265
[45] Date of Patent: Jun. 4, 1996

[54] GLASS COMPOSITIONS AND FIBERS THEREFROM

[75] Inventors: Charles F. Rapp; Stephanie M. Mattson, both of Newark, Ohio

[73] Assignee: Owens-Corning Fiberglas Technology, Inc., Summit, Ill.

[21] Appl. No.: 434,223

[22] Filed: May 4, 1995

[51] Int. Cl.$^6$ .................. C03C 13/00; C03C 3/085; C03C 3/091
[52] U.S. Cl. ................ 501/35; 501/65; 501/66; 501/69; 501/72
[58] Field of Search ................ 501/35, 65, 66, 501/69, 72

[56] References Cited

U.S. PATENT DOCUMENTS

| | | | |
|---|---|---|---|
| 1,828,217 | 10/1931 | Barker, Jr. | |
| 2,313,296 | 3/1943 | Lamesch | 49/92 |
| 2,331,945 | 10/1943 | Paziczky et al. | 49/1 |
| 2,693,668 | 11/1954 | Slayter | 49/92 |
| 2,877,124 | 3/1959 | Welsch | 106/54 |
| 2,927,621 | 3/1960 | Slayter et al. | 154/1 |
| 2,998,620 | 9/1961 | Stalego | 18/2.6 |
| 3,073,005 | 1/1963 | Tiede | 28/82 |
| 3,653,861 | 4/1972 | Stalego et al. | 65/16 |
| 3,791,806 | 2/1974 | Koizumi et al. | 65/3 |
| 3,881,903 | 5/1975 | Stalego | 65/16 |
| 4,145,199 | 3/1979 | Russell | 65/2 |
| 4,177,077 | 12/1979 | Gagin | 106/50 |
| 4,387,180 | 6/1983 | Jen et al. | 501/38 |
| 4,707,399 | 11/1987 | Rambosek | 428/225 |
| 5,055,428 | 10/1991 | Potter | 501/35 |
| 5,108,957 | 4/1992 | Cohen et al. | 501/35 |
| 5,332,698 | 7/1994 | Nyssen et al. | 501/35 |
| 5,401,693 | 3/1995 | Bauer et al. | 501/38 |

FOREIGN PATENT DOCUMENTS

| | | |
|---|---|---|
| 0412878 | 1/1990 | European Pat. Off. . |
| 399320 | 11/1990 | European Pat. Off. . |
| 0588251 | 3/1994 | European Pat. Off. . |
| 8912032 | 12/1989 | WIPO . |

*Primary Examiner*—Mark L. Bell
*Assistant Examiner*—Louis M. Troilo
*Attorney, Agent, or Firm*—C. M. Gegenheimer; Patrick P. Pacella

[57] ABSTRACT

Fiberizable glass composition with increased levels of BaO are suitable for insulation. These glasses have physical properties which allow current processes to fabricate them into insulation. The glasses also meet proposed German regulations regarding KI≧40.

15 Claims, No Drawings

5,523,265

GLASS COMPOSITIONS AND FIBERS THEREFROM

TECHNICAL FIELD

This invention relates to sodium barium borosilicate glass compositions. Fibers from these compositions make glass fiber insulation.

BACKGROUND OF THE INVENTION

Glass fiber insulation is well known and has been a commercial product for a long period of time. The insulation is made from intertwined soda lime alumina borosilicate glass fiber which a binder holds together. The binder may be any suitable material but quite commonly is a phenolformaldehyde resin or a ureaformaldehyde resin. These binders are well known and a spray nozzle generally applies them to the glass fibers as hot gases attenuate the fibers from a rotating device, commonly called a spinner. A conveyer collects the binder-coated fibers in the form of a blanket, and heat cures the blanket to produce the final insulation. The process produces various densities by varying the conveyor speed and the thickness of the cured insulation.

The German government has proposed regulations for glass fibers. Glass fiber compositions meeting the regulations are considered to be free of suspicion. The problem, however, for the manufacturer is to produce glass fibers which meet the regulations and standard criteria. These glasses must meet the proposed regulations, be fiberizable in standard wool processes, have sufficient durability and have acceptable insulating properties.

DISCLOSURE OF THE INVENTION

We have developed glass compositions which meet all the criteria. Our glasses have a high BaO content, a high soda content and contain small amounts of alumina. The glass compositions meet the proposed German regulations. They have a numerical index (KI) greater than or equal to 40. Standard wool processes easily produce fibers from these compositions. The difference (delta T) between the temperature where the glass has a viscosity of 1,000 poise and the liquidus temperature generally is 50° F. and is often 200° F. or greater. Durability as shown by fiber weight loss is good and is often less than 5% fiber weight loss after 24 hours in water at 205° F.

Best Mode of Carrying Out Invention

We made measurements of viscosity, liquidus and durability for a number of glasses with KI≧40. The measurements indicated a compositional region of glasses which are useful for production of glass fiber insulation. This range is as follows for the major components:

| Ingredients | Weight Percent |
| --- | --- |
| $SiO_2$ | 45–60 |
| $Al_2O_3$ | 0–3 |
| $B_2O_3$ | 0–20 |
| $Na_2O + K_2O$ | 12–22 |
| $MgO + CaO$ | 0–14 |
| BaO | 2–35 | and less than about 10% of any or all of ZnO, $TiO_2$, $Fe_2O_3$, $ZrO_2$, SrO or $Li_2O$, the total being 100% by weight, wherein each glass composition has a KI value equal to or greater than 40.

More preferably, the glass compositions consist essentially of:

| Ingredients | Weight Percent |
| --- | --- |
| $SiO_2$ | 45–57 |
| $Al_2O_3$ | 0.8–3 |
| $B_2O_3$ | 0–18 |
| $Na_2O + K_2O$ | 12–22 |
| $MgO + CaO$ | 0–14 | and less than about 5% of any or all of ZnO, $TiO_2$, $Fe_2O_3$, $ZrO_2$, SrO or $Li_2O$, the total being 100% by weight, and wherein each glass composition has a KI value equal to or greater than 40.

Even more preferably, the glass compositions have a BaO content of 5 to 30 weight percent and less than about 2% of any or all of ZnO, $TiO_2$, $Fe_2O_3$, $ZrO_2$, SrO or $Li_2O$. Even more preferably the glass compositions have a a BaO combat of 12 to 25 weight percent, and less than 2% of any or all of ZnO, $TiO_2$, $Fe_2O_3$, $ZrO_2$, SrO or $Li_2O$.

Insulation products of these glass fibers can be produced from a conventional fiber forming process.

The German regulation requires a numerical index (KI) greater than or equal to 40 to be considered free of suspicion. The index is calculated by $KI=\Sigma(Na_2O, K_2O, CaO, MgO, BaO, B_2O_3)-2Al_2O_3$. This places severe restrictions on alumina levels and anything not included in the index, such as silica. The obvious choice is to lower alumina to very low levels. These glasses, however, have poor durabilities and most could not be fiberized by a standard wool process. We discovered that high BaO levels yielded glasses with significantly improved durability and fiberizability by standard processes.

We designed an array of glasses to show the effect of glass composition in this narrow field on select properties. All glasses are shown together with measured properties in the following table.

Examples of the compositions are given in the following table. All the glass compositions have KI index of 40 or higher.

Example 1

Glass fibers of the present invention have the following compositions. Most of the compositions have measured forming temperatures (the temperature where the viscosity of the glass is about 1,000 poise) and liquidus temperatures.

TABLE

| Ingredients: | 1 | 2 | 3 | 4 | 5 | 6 | 7 | 8 | 9 | 10 | 11 | 12 |
|---|---|---|---|---|---|---|---|---|---|---|---|---|
| | Weight Percent | | | | | | | | | | | |
| $SiO_2$ | 54.5 | 55.0 | 56.3 | 56.4 | 56.5 | 56.5 | 56.3 | 56.4 | 54.5 | 54.4 | 55.2 | 54.8 |
| $Al_2O_3$ | 0.9 | 1.0 | 1.0 | 1.0 | 1.0 | 0.9 | 1.0 | 1.0 | 1.0 | 1.0 | 1.6 | 1.7 |
| $B_2O_3$ | 1.5 | 1.5 | 15.1 | 13.3 | 9.8 | 6.2 | 13.3 | 11.6 | 15.2 | 15.4 | — | — |
| $Na_2O$ | 12.4 | 12.5 | 14.5 | 14.4 | 14.1 | 13.8 | 14.6 | 14.5 | 14.5 | 14.4 | 15.5 | 16.5 |
| $K_2O$ | 6.0 | 6.0 | 0.8 | 0.8 | 0.7 | 0.7 | 0.8 | 0.8 | 0.8 | 0.8 | — | — |
| MgO | 1.1 | 1.1 | 2.6 | 2.6 | 2.5 | 2.5 | 3.1 | 3.0 | 2.6 | 2.6 | — | 1.8 |
| CaO | 3.1 | 3.1 | 7.3 | 7.1 | 7.0 | 6.9 | 8.5 | 8.4 | 7.2 | 7.2 | — | 4.0 |
| BaO | 17.8 | 17.8 | 2.0 | 4.0 | 8.0 | 12.1 | 2.0 | 4.0 | 2.0 | 2.0 | 27.7 | 21.2 |
| $TiO_2$ | — | — | 0.1 | 0.1 | 0.1 | 0.1 | 0.1 | 0.1 | 2.0 | 0.1 | — | — |
| $Fe_2O_3$ | 0.2 | 0.2 | 0.3 | 0.3 | 0.3 | 0.3 | 0.3 | 0.3 | 0.3 | 0.3 | — | — |
| $ZrO_2$ | 2.5 | 1.8 | — | — | — | — | — | — | — | 2.0 | — | — |
| T (°F.) for viscosity of 1,000 Poise | 1903 | 1882 | 1737 | 1738 | 1761 | 1789 | 1739 | 1747 | 1714 | 1740 | 1882 | 1867 |
| Liquidus Temperature (F°) | 1524 | — | 1498 | 1481 | 1548 | 1553 | 1578 | 1567 | 1538 | 1551 | — | — |
| KI | 40.0 | 40.0 | 40.3 | 40.3 | 40.3 | 40.3 | 40.3 | 40.3 | 40.3 | 40.3 | 40.0 | 40.0 |
| durability (% wt loss of fibers after 24 hrs)* | 7.0 | — | 4.7 | 4.3 | 3.8 | 3.6 | — | — | — | — | — | — |

*Exposure to water at 205° F.

We claim:

1. Fiberizable glass compositions suitable for insulation consisting essentially of:

| Ingredients | Weight Percent |
|---|---|
| $SiO_2$ | 45–60 |
| $Al_2O_3$ | 0–3 |
| $B_2O_3$ | 0–20 |
| $Na_2O + K_2O$ | 12–22 |
| $MgO + CaO$ | 0–14 |
| BaO | 2–35 | and less than about 10% of any or all of ZnO, $TiO_2$, $Fe_2O_3$, $ZrO_2$, SrO or $Li_2O$, the total being 100% by weight, and wherein each glass composition has a KI value equal to or greater than 40.

2. Fiberizable glass compositions suitable for insulation consisting essentially of:

| Ingredients | Weight Percent |
|---|---|
| $SiO_2$ | 45–57 |
| $Al_2O_3$ | 0.8–3 |
| $B_2O_3$ | 0–18 |
| $Na_2O + K_2O$ | 12–22 |
| $MgO + CaO$ | 0–14 |
| BaO | 2–30 | and less than about 5% of any or all of ZnO, $TiO_2$, $Fe_2O_3$, $ZrO_2$, SrO or $Li_2O$, the total being 100% by weight, and wherein each glass composition has a KI value equal to or greater than 40.

3. Glass compositions according to claim 2 having a BaO content of 5 to 30 weight percent and less than about 2% of any or all of ZnO, $TiO_2$, $Fe_2O_3$, $ZrO_2$, SrO or $Li_2O$.

4. Glass compositions according to claim 2 having a BaO content of 12 to 25 weight % and less than about 2% of any or all of ZnO, $TiO_2$, $Fe_2O_3$, $ZrO_2$, SrO or $Li_2O$.

5. Glass compositions according to claim 1 having the compositions of:

| Ingredients | Weight Percent |
|---|---|
| $SiO_2$ | 54.5 |
| $Al_2O_3$ | 0.9 |
| $B_2O_3$ | 1.5 |
| $Na_2O$ | 12.4 |
| $K_2O$ | 6.0 |
| MgO | 1.1 |
| CaO | 3.1 |
| BaO | 17.8 |
| $Fe_2O_3$ | 0.2 |
| $ZrO_2$ | 2.5 |

6. Glass fibers having glass compositions according to claim 1.

7. Glass fibers having glass compositions according to claim 2.

8. Glass fibers having glass compositions according to claim 3.

9. Glass fibers having glass compositions according to claim 4.

10. Glass fibers having glass compositions according to claim 5.

11. Glass fiber insulation comprising a collection of glass fibers according to claim 6.

12. Glass fiber insulation comprising a collection of glass fibers according to claim 7.

13. Glass fiber insulation comprising a collection of glass fibers according to claim 8.

14. Glass fiber insulation comprising a collection of glass fibers according to claim 9.

15. Glass fiber insulation comprising a collection of glass fibers according to claim 10.

* * * * *